(12) United States Patent
Liu et al.

(10) Patent No.: US 10,942,755 B2
(45) Date of Patent: Mar. 9, 2021

(54) INTERFACE SWITCHING METHOD AND DEVICE, AND COMPUTER READABLE STORAGE MEDIUM

(71) Applicant: SHENZHEN LAUNCH SOFTWARE CO., LTD., Guangdong (CN)

(72) Inventors: Jun Liu, Guangdong (CN); Chunwu Deng, Guangdong (CN); Wuchao Jin, Guangdong (CN)

(73) Assignee: SHENZHEN LAUNCH SOFTWARE CO., LTD., Guangdon (CN)

( * ) Notice: Subject to any disclaimer, the term of this patent is extended or adjusted under 35 U.S.C. 154(b) by 69 days.

(21) Appl. No.: 16/370,042

(22) Filed: Mar. 29, 2019

(65) Prior Publication Data
US 2019/0332398 A1    Oct. 31, 2019

Related U.S. Application Data

(63) Continuation-in-part of application No. PCT/CN2018/084449, filed on Apr. 25, 2018.

(51) Int. Cl.
*G06F 3/00* (2006.01)
*G06F 9/00* (2006.01)
*G06F 17/00* (2019.01)
*G06F 9/451* (2018.01)
*G06F 8/38* (2018.01)

(52) U.S. Cl.
CPC .............. *G06F 9/451* (2018.02); *G06F 8/38* (2013.01)

(58) Field of Classification Search
CPC ................... G06F 9/451; G06F 8/38
See application file for complete search history.

(56) References Cited

U.S. PATENT DOCUMENTS

| 5,793,368 A | * | 8/1998 | Beer | G06F 9/451 715/747 |
| 2001/0040591 A1 | * | 11/2001 | Abbott | G06F 3/016 715/700 |
| 2014/0344668 A1 | | 11/2014 | Bernath et al. | |

FOREIGN PATENT DOCUMENTS

CN    105227426    1/2016

OTHER PUBLICATIONS

International Search Report and Written Opinion of PCT/CN2018/084449 dated Jan. 17, 2019, 9 pages (Chinese).

* cited by examiner

*Primary Examiner* — Tadesse Hailu
*Assistant Examiner* — Anita D. Chaudhuri
(74) *Attorney, Agent, or Firm* — Rankin, Hill & Clark LLP

(57) ABSTRACT

The present disclosure provides an interface switching method, including: loading a display interface of a default style based on a preset parent theme type when an application starts; monitoring whether a data type processed by the application changes in real time operation of the application; obtaining a preset child theme type corresponding to a data type currently processed by the application based on the data type currently processed by the application if the data type changes, wherein a value of an attribute name of which a display style needs to be changed relative to the parent theme type is defined in the child theme type; and switching a display style of the display interface based on the value of the attribute name defined in the child theme type and of which the display style needs to be changed relative to the parent theme type.

9 Claims, 4 Drawing Sheets

INTERFACE SWITCHING METHOD AND DEVICE, AND COMPUTER READABLE STORAGE MEDIUM

This application is a continuation-in-part of Serial No. PCT/CN2018/084449 filed on Apr. 25, 2018 and its entirety is expressly incorporated herein by reference.

TECHNICAL FIELD

The present disclosure pertains to the technical field of interface switching, and particularly, to an interface switching method, an interface switching system, an interface switching device, and a computer readable storage medium.

BACKGROUND

Currently, most display interfaces of intelligent electronics support a theme function, for example, a title background, a font color, and an input box style in the interfaces. Currently, in a technical solution in which an intelligent electronic device switches themes in a display interface, some constants are usually specified in a place in which a theme style is specified, and different themes are corresponding to different values in the place in which the style is specified. In this theme switching technology, values of all attribute names need to be specified in different themes. Consequently, some attribute names have duplicate values in some similar themes, and are easily confused in a modification.

SUMMARY

Currently, there is a problem in switching themes of an existing intelligent electronic device that, values of all attribute names need to be specified in different themes, and consequently, some attribute names have duplicate values in some similar themes and are easily confused in a modification.

A first aspect of the present disclosure provides an interface switching method, including:

loading a display interface of a default style based on a preset parent theme type when an application starts;

monitoring whether a data type processed by the application changes in real time operation of the application;

obtaining a preset child theme type corresponding to a data type currently processed by the application based on a data type currently processed by the application if the data type changes, wherein a value of an attribute name of which a display style needs to be changed relative to the parent theme type is defined in the child theme type; and switching a display style of the display interface based on the value of the attribute name defined in the child theme type and of which the display style needs to be changed relative to the parent theme type.

On the basis of the foregoing technical solutions, before the step of loading, when an application starts, a display interface of a default style based on a preset parent theme type, the method further includes:

collecting statistics about attribute names that do not need to be changed and attribute names that need to be changed during the operation of the application;

setting a parent theme type, and defining a value of an attribute name that does not need to be changed and/or a default value of an attribute name that needs to be changed in the parent theme type; and separately setting corresponding child theme types for different data types, and defining a value of attribute names that need to be changed relative to the parent theme type in the various child theme types.

On the basis of the foregoing technical solutions, the data types include a data source type and/or a data attribute type, and the step of separately setting corresponding child theme types for different data types includes:

setting different child theme types for different types of data sources; and/or setting different child theme types for different types of data attributes.

On the basis of the foregoing technical solutions, the step of switching a display style of the display interface based on the value of the attribute name defined in the child theme type and of which the display style needs to be changed relative to the parent theme type includes:

obtaining an attribute name defined in the parent theme type and an attribute name defined in the child theme type; and overwriting a value of a same attribute name defined in the parent theme by using a value of a same attribute name defined in the child theme type, if the child theme type and the parent theme type include the same attribute name; or displaying a new attribute name on the display interface based on a value of a new attribute name defined in the child theme type, if the child theme type includes a new attribute name relative to the parent theme type.

A second aspect of the present disclosure provides an interface switching device, including: a memory, a processor, and a computer program stored in the memory and executable on the processor, where the processor is configured to execute the computer program to implement steps in an interface switching method, including: loading a display interface of a default style based on a preset parent theme type when an application starts; monitoring whether a data type processed by the application changes in real time operation of the application; obtaining a preset child theme type corresponding to a data type currently processed by the application based on the data type currently processed by the application if the data type changes, wherein a value of an attribute name of which a display style needs to be changed relative to the parent theme type is defined in the child theme type; and switching a display style of the display interface according to the value of the attribute name defined in the child theme type and of which the display style needs to be changed relative to the parent theme type.

On the basis of the foregoing technical solutions, where before the step of loading a display interface of a default style based on a preset parent theme type when an application starts, the processor is further configured to perform the step of collecting statistics about attribute names that do not need to be changed and attribute names that need to be changed during the operation of the application; setting the parent theme type, and defining a value of attribute names that do not need to be changed and/or a default value of attribute names that need to be changed in the parent theme type; and separately setting corresponding child theme types for different data types, and defining value of attribute names that need to be changed relative to the parent theme types in the various child theme types.

On the basis of the foregoing technical solutions, where the data types include a data source type and/or a data attribute type, and the processor is further configured to perform the step of separately setting corresponding child theme types for different data types by setting different child theme types for different types of data sources; and/or setting different child theme types for different types of data attributes.

On the basis of the foregoing technical solutions, where the processor is further configured to perform the step of switching a display style of the display interface based on the value of the attribute name defined in the child theme type and of which the display style needs to be changed relative to the parent theme type by obtaining an attribute name defined in the parent theme type and an attribute name defined in the child theme type; overwriting a value of a same attribute name defined in the parent theme by using a value of a same attribute name defined in the child theme type if the child theme type and the parent theme type comprise the same attribute name; and displaying a new attribute name on the display interface based on a value of the new attribute name defined in the child theme type if the child theme type comprises the new attribute name relative to the parent theme type.

A third aspect of the present disclosure provides a computer readable storage medium, wherein the computer readable storage medium stores a computer program, and when the computer program is executed by a processor, the processor is configured to implement steps in an interface switching method, including: loading a display interface of a default style based on a preset parent theme type when an application starts; monitoring whether a data type processed by the application changes in real time operation of the application; obtaining a preset child theme type corresponding to a data type currently processed by the application based on the data type currently processed by the application if the data type changes, wherein a value of an attribute name of which a display style needs to be changed relative to the parent theme type is defined in the child theme type; and switching a display style of the display interface according to the value of the attribute name defined in the child theme type and of which the display style needs to be changed relative to the parent theme type.

On the basis of the foregoing technical solutions, where before the step of loading a display interface of a default style based on a preset parent theme type when an application starts, the processor is further configured to perform the step of collecting statistics about attribute names that do not need to be changed and attribute names that need to be changed during the operation of the application; setting the parent theme type, and defining a value of attribute names that do not need to be changed and/or a default value of attribute names that need to be changed in the parent theme type; and separately setting corresponding child theme types for different data types, and defining value of attribute names that need to be changed relative to the parent theme types in the various child theme types.

On the basis of the foregoing technical solutions, where the data types include a data source type and/or a data attribute type, and the processor is further configured to perform the step of separately setting corresponding child theme types for different data types by setting different child theme types for different types of data sources; and/or setting different child theme types for different types of data attributes.

On the basis of the foregoing technical solutions, where the processor is further configured to perform the step of switching a display style of the display interface based on the value of the attribute name defined in the child theme type and of which the display style needs to be changed relative to the parent theme type by obtaining an attribute name defined in the parent theme type and an attribute name defined in the child theme type; overwriting a value of a same attribute name defined in the parent theme by using a value of a same attribute name defined in the child theme type if the child theme type and the parent theme type comprise the same attribute name; and displaying a new attribute name on the display interface based on a value of the new attribute name defined in the child theme type if the child theme type comprises the new attribute name relative to the parent theme type.

According to the present disclosure, when the application starts, the display interface of the default style is loaded based on the preset parent theme type; during operation of the application, whether the data type processed by the application changes is monitored in real time; if the data type changes, the preset child theme type corresponding to the currently processed data type is obtained based on the data type currently processed by the application, wherein the value of the attribute name of which the display style needs to be changed relative to the parent theme type is defined in the child theme type; and the display style of the display interface is changed based on the value of the attribute name defined in the child theme type and of which the display style needs to be changed relative to the parent theme type. This can avoid confusion and lack of specificity in a modification due to duplicate value assignment of a same attribute in a child theme and a parent theme, and can display interfaces of different styles at different running stages of the application, thereby improving user experience.

BRIEF DESCRIPTION OF DRAWINGS

To describe the technical solutions in the embodiments of the present disclosure more clearly, the accompanying drawings required for describing the embodiments or the prior art are briefly described in the following.

DESCRIPTION OF EMBODIMENTS

In the following descriptions, to facilitate understanding of the embodiments of the present disclosure clearly, specific details about a specific system structure, technology, and the like are provided for illustration, but not for limitation. In other cases, detailed descriptions of a well-known system, interface switching device, circuit, and method are omitted, so that the present disclosure may be avoided from being obstructed by unnecessary details.

To describe the technical solutions in the present disclosure, the following uses specific embodiments for illustration.

Figure 1:
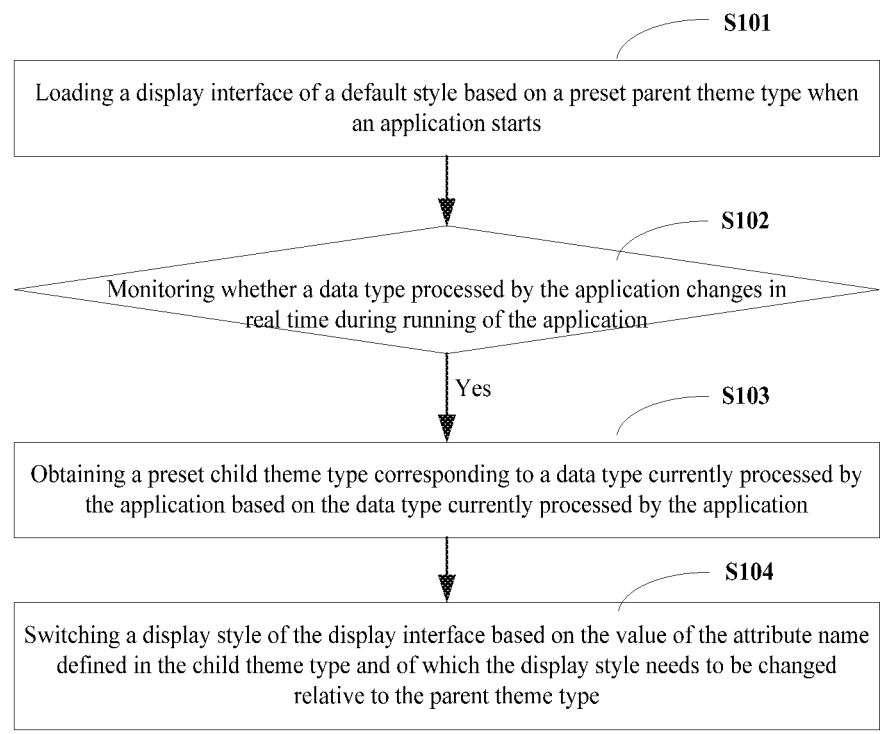
FIG. 1 is a schematic implementation flow diagram of an interface switching method according to an embodiment of the present disclosure.

FIG. 1 shows an implementation process of an interface switching method according to an embodiment of the present disclosure. The method is applied to an interface switching device. Referring to FIG. 1, details about the implementation process of the interface switching method provided in this embodiment are as follows.

Step 101, loading a display interface of a default style based on a preset parent theme type when an application starts.

In this embodiment, the interface switching device is an intelligent electronic device with a display function, and the application is any type of application installed on the interface switching device. When the application starts, the interface switching device loads, as an initial display interface of the application, the display interface of the default style based on the preset parent theme type.

In this embodiment, value of attribute names that do not need to be changed and/or default value of attribute names that need to be changed are defined in the parent theme type. For example, in the parent theme type, an attribute value of an interface background displayed when the application starts may be set to a white color by default, and an attribute value of an interface font color may be set to a black font by default. When the application starts, the interface is displayed based on values of attribute names defined in the parent theme type.

Step 102, monitoring whether a data type processed by the application changes in real time operation of the application. If the data type changes, go to step S103. If the data type does not change, do not perform any operation.

In this embodiment, the data types include a data source type and/or a data attribute type. The data source is referred to as a source of data currently processed by the application. For example, when the data is read from an external device, the data source is a device type of the external device. The data attribute means that data read at different running stages is in different categories for a same data source. Data streams read from an external device at different running stages by the application are of different types. By monitoring, via the application, in real time, whether a currently processed data type changes, whether a running stage at which the application is currently located changes may be determined. When the data type changes, it indicates that the running stage at which the application is located changes, and in this case, a next step is performed. When the data type does not change, it indicates that the stage at which the application is currently located does not change, and in this case, no operation is performed.

Step 103, obtaining a preset child theme type corresponding to a data type currently processed by the application based on the data type currently processed by the application.

In this embodiment, different data source types or different data attribute types are corresponding to different child theme types, and values of attribute names defined in the child theme respectively show corresponding features of the application at different running stages. For example, in a child theme type corresponding to a data type when the application enters a shutdown stage, an attribute value for an interface background is defined as a shutdown icon photo.

Step 104, switching a display style of the display interface based on the value of the attribute name defined in the child theme type and of which the display style needs to be changed relative to the parent theme type.

In this embodiment, step S104 specifically includes:

obtaining an attribute name defined in the parent theme type and an attribute name defined in the child theme type; and overwriting a value of a same attribute name defined in the parent theme by using a value of a same attribute name defined in the child theme type if the child theme type and the parent theme type include the same attribute name; or displaying a new attribute name on the display interface based on a value of a new attribute name defined in the child theme type if the child theme type includes a new attribute name relative to the parent theme type.

In this embodiment, when different attribute values are defined for a same attribute name in the parent theme type and in the child theme type, during interface switching, aiming at the same attribute name, an attribute value defined in the parent theme type is overwritten by using an attribute value defined in the child theme type. For example, in a specific embodiment, if an interface background corresponding to a shutdown stage is a white color in the parent theme type, and an interface background corresponding to a shutdown stage is a shutdown icon photo in the child theme type, when the shutdown stage is entered, the interface background switches from the white color to the shutdown icon photo.

In this embodiment, a new attribute name may be added to the child theme type and an attribute value may be defined for the new attribute name. When the child theme type includes a new attribute name relative to the parent theme type, during interface switching, a module corresponding to the new attribute name needs to be displayed on a preset position in the interface based on an attribute value of the new attribute name. The attribute value of the new attribute name not only includes a display style of the new attribute name, but also includes a position where the new attribute name is displayed in the interface.

It may be seen from what described above that, according to the interface switching method provided in this embodiment, when the application starts, the display interface of the default style is loaded based on the preset parent theme type; during operation of the application, whether the data type processed by the application changes is monitored in real time; if the data type changes, the preset child theme type corresponding to the currently processed data type is obtained based on the data type currently processed by the application, wherein the value of the attribute name of which the display style needs to be changed relative to the parent theme type is defined in the child theme type; and the display style of the display interface is changed based on the value of the attribute name defined in the child theme type and of which the display style needs to be changed relative to the parent theme type. This can prevent confusion and lack of specificity in a modification due to duplicate value assignment of a same attribute in a child theme and a parent theme, and can display interfaces of different styles at different running stages of the application, thereby improving user experience.

Figure 2:
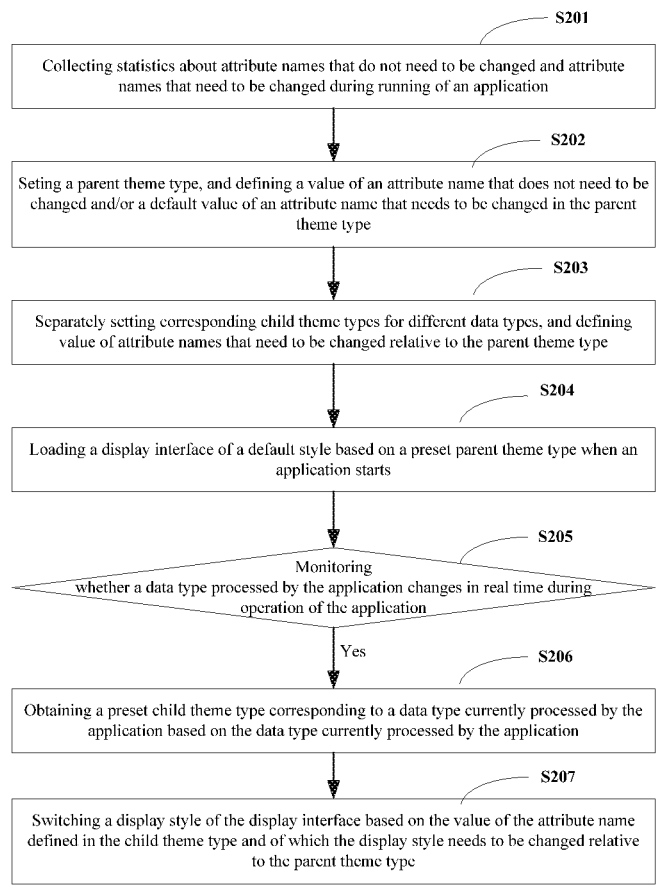
FIG. 2 is a schematic implementation flow diagram of an interface switching method according to another embodiment of the present disclosure.

FIG. 2 is a schematic implementation flow diagram of an interface switching method according to another embodiment of the present disclosure. The method is applied to a vehicle diagnostic device. Referring to FIG. 2, compared with the aforesaid embodiment, the interface switching method provided in this embodiment further includes:

Step 201, collecting statistics about attribute names that do not need to be changed and attribute names that need to be changed during the operation of the application.

Step 202, setting a parent theme type, and defining a value of an attribute name that does not need to be changed and/or a default value of an attribute name that needs to be changed.

Step 203, separately setting corresponding child theme types for different data types, and defining a value of attribute names that need to be changed relative to the parent theme type in the various child theme types.

The data types include a data source type and/or a data attribute type, and the step of separately setting corresponding child theme types for various kinds of vehicle information includes:

setting different child theme types for different types of data sources; and/or set different child theme types for different types of data attributes.

In this embodiment, because that the value defined in the child theme types is the value of the attribute name that needs to be changed relative to the parent theme type, but not values of all attribute names, there is no duplicate attribute value in the child theme types and the parent theme type. In this way, not only an interface switching processing step is simplified, but also the confusion in a modification is prevented.

In this embodiment, when there is a slight difference between two child theme types, one child theme may be used as a parent theme of the other child theme. This can achieve mutual sharing of an attribute value and facilitate a subsequent targeted modification.

In this embodiment, because that different child theme types are set for different types of data sources, when the application is applied to different devices, interfaces of different styles may be displayed based on features of the devices. In addition, because that different child theme types are set for different types of data attributes, when the application is applied to a specific device, interfaces of different styles may be displayed based on differences of running stages at which the application is located, and the display styles corresponding to the running stages respectively reflect features of the running stages.

Step 204, loading, when an application starts, a display interface of a default style based on a preset parent theme type.

Step 205, monitoring, in real time operation of the application, whether a data type processed by the application changes. If the data type changes, go to step S206. If the data type does not change, do not perform any operation.

Step 206, obtaining, based on a data type currently processed by the application, a preset child theme type corresponding to the currently processed data type.

Step 207, switching a display style of the display interface based on the value of the attribute name defined in the child theme type and of which the display style needs to be changed relative to the parent theme type.

It should be noted that steps 204-207 in this embodiment are respectively the same as steps 101-104 in the foregoing embodiment. Therefore, details are not repeatedly described herein.

It may be learned from the above that the interface switching method provided in this embodiment can also prevent confusion and lack of specificity in a modification due to duplicate value assignment of a same attribute in a child theme and a parent theme, and can display interfaces of different styles at different running stages of the application, thereby improving user experience.

Figure 3A:
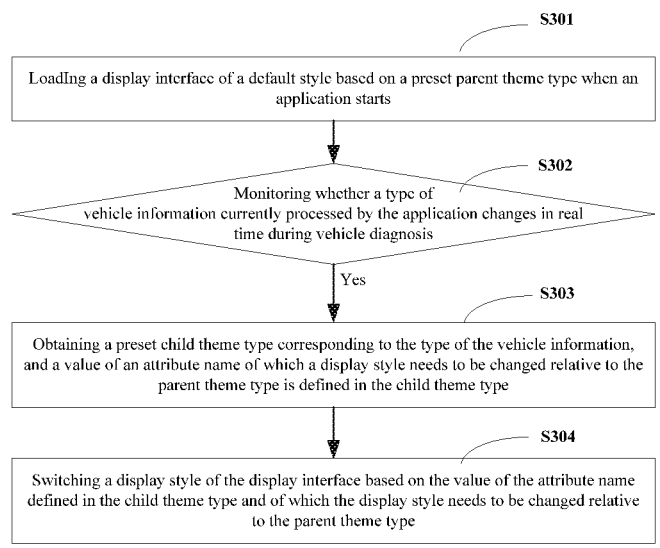
FIG. 3a is a schematic implementation flow diagram of an interface switching method according to an exemplary embodiment of the present disclosure.

FIG. 3a shows an implementation process of an interface switching method according to an exemplary embodiment of the present disclosure. The method is applied to a vehicle diagnostic device. Referring to FIG. 3a, the implementation process of the interface switching method provided in this embodiment are as described in detail as follows.

Step 301, loading a display interface of a default style based on a preset parent theme type when an application starts.

Preferably, in this embodiment, before step S301, the method may further include:

collecting statistics about attribute names that do not need to be changed and attribute names that need to be changed during vehicle diagnosis;

setting a parent theme type, and defining a value of attribute names that do not need to be changed in the parent theme type; and separately setting corresponding child theme types for various vehicle information, and defining, in the child theme types, a value of attribute names that need to be changed relative to the parent theme type.

The vehicle information includes a vehicle identification number and/or a vehicle data stream type that is read by the vehicle diagnostic device in real time. The step of separately setting corresponding child theme types for various kinds of vehicle information includes:

setting different child theme types for different types of vehicle identification numbers; and/or setting different child theme types for different types of vehicle data streams.

In this embodiment, because that the value defined in the child theme types is the value of the attribute name that needs to be changed relative to the parent theme type, but not values of all attribute names, there is no duplicate attribute value in the child theme types and the parent theme type. In this way, not only an interface switching processing step is simplified, but also confusion in a modification is prevented.

In this embodiment, when there is a slight difference between two child theme types, one child theme may be used as a parent theme of the other child theme. This can achieve mutual sharing of an attribute value and facilitate a subsequent targeted modification.

In this embodiment, because that different child theme types are set for different types of vehicle identification numbers, when the application performs diagnosis for different types of vehicles, interfaces of different styles may be displayed based on features of the vehicles. In addition, because different child theme types are set for different types of vehicle data streams, when the application is applied to a specific vehicle, interfaces of different styles may be displayed based on different diagnosis stages, and the display styles corresponding to the diagnosis stages respectively reflect features of the diagnosis stages.

In this embodiment, the application is a vehicle diagnostic application installed on the vehicle diagnostic device, and when the application starts, the vehicle diagnostic device loads, as an initial display interface of the application, the display interface of the default style based on the preset parent theme type.

In this embodiment, a value of attribute names that do not need to be changed and/or a default value of attribute names that need to be changed are defined in the parent theme type. For example, in the parent theme type, an attribute value of a background color on a diagnosis interface when the application starts may be set to a white color by default, and an attribute value of a font color on the diagnosis interface may be set to a black font by default. When the application starts, the interface is displayed based on values of attribute names defined in the parent theme type.

Step 302, monitoring, in real time during vehicle diagnosis, whether a type of vehicle information currently processed by the application changes. If the type changes, go to step 303. If the type does not change, don't perform operation.

In this embodiment, the vehicle information includes a vehicle identification number and/or a vehicle data stream type that is read by the vehicle diagnostic device in real time. The vehicle identification number (Vehicle Identification Number, VIN) includes 17 characters, generally referred to as a 17 character VIN, and includes information such as a vehicle's manufacturer, year, model, body type and code, engine code, and assembly location. Vehicle data stream types read by the vehicle diagnostic device at different diagnosis stages are different. A diagnosis stage at which a current vehicle diagnostic device is currently located may be determined based on a vehicle data stream type read by the vehicle diagnostic device in real time.

Step 303, obtaining a preset child theme type corresponding to the type of the vehicle information. A value of an attribute name of which a display style needs to be changed relative to the parent theme type is defined in the child theme type.

In this embodiment, different vehicle identification numbers or different vehicle data stream types are corresponding to different child theme types, and values of attribute names defined in the child theme respectively show features of a corresponding vehicle at different diagnosis stages. For example, in a child theme type corresponding to a vehicle data stream type read in real time when the vehicle diagnostic device enters an engine diagnosis stage, an attribute value of a diagnosis interface background is defined as an engine photo.

Step 304, switching a display style of the display interface based on the value of the attribute name defined in the child theme type and of which the display style needs to be changed relative to the parent theme type.

In this embodiment, step 304 particularly includes:

obtaining an attribute name defined in the parent theme type and an attribute name defined in the child theme type; and overwriting a value of a same attribute name defined in the parent theme by using a value of a same attribute name defined in the child theme type if the child theme type and the parent theme type include the same attribute name; or displaying a new attribute name on the display interface based on a value of a new attribute name defined in the child theme type if the child theme type includes the new attribute name relative to the parent theme type.

In this embodiment, when different attribute values are defined for a same attribute name in the parent theme type and the child theme type, during interface switching, aiming at the same attribute name, an attribute value defined in the parent theme type is overwritten by using an attribute value defined in the child theme type. For example, in a specific embodiment, if an interface background corresponding to an engine diagnosis stage is a white color in the parent theme type, and an interface background corresponding to an engine diagnosis stage is an engine photo in the child theme type, when the engine diagnosis stage is entered, the interface background switches from the white color to the engine photo.

In this embodiment, a new attribute name may be added to the child theme type and an attribute value may be defined for the new attribute name. When the child theme type includes a new attribute name relative to the parent theme type, during interface switching, a module corresponding to the new attribute name needs to be displayed on a preset position in the interface based on an attribute value of the new attribute name. The attribute value of the new attribute name not only includes a display style of the new attribute name, but also includes a position in which the new attribute name is displayed and that is in the interface.

It should be noted that, in this embodiment, when there is a slight difference between two child theme types, one child theme may be used as a parent theme of the other child theme. This can achieve mutual sharing of an attribute value and facilitate a subsequent targeted modification.

It may be learned from the above that according to the interface switching method provided in this embodiment, when the application starts, the display interface of the default style is loaded based on the preset parent theme type; during vehicle diagnosis, the vehicle information is read in real time, and the preset child theme type corresponding to the vehicle information is obtained, wherein the value of the attribute name of which the display style needs to be changed relative to the parent theme type is defined in the child theme type; and the display style of the display interface is changed based on the value of the attribute name defined in the child theme type and of which the display style needs to be changed relative to the parent theme type. This can prevent confusion and lack of specificity in a modification due to duplicate value assignment of a same attribute in a child theme and a parent theme, and can display interfaces of different styles respectively for different vehicles at different diagnosis stages, thereby improving user experience.

Figure 3B:
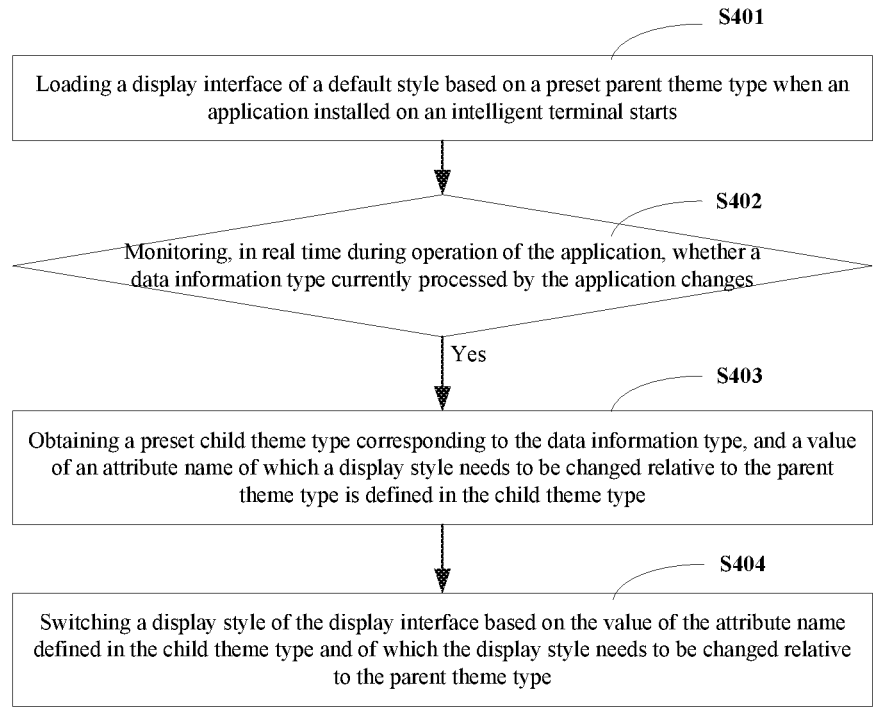
FIG. 3b is a schematic implementation flow diagram of an interface switching method according to another exemplary embodiment of the present disclosure.

FIG. 3b shows an implementation process of an interface switching method according to another exemplary embodiment of the present disclosure. The method is applied to an intelligent terminal Referring to FIG. 3b, details about the implementation process of the interface switching method provided in this embodiment are as follows.

Step 401, loading a display interface of a default style based on a preset parent theme type when an application installed on the intelligent terminal starts.

Step S402, monitoring whether a data information type currently processed by the application changes in real time operation of the application. If the data information type changes, go to step S403. If the data information type does not change, don't perform any operation.

Step 403, obtaining a preset child theme type corresponding to the data information type. A value of an attribute name of which a display style needs to be changed relative to the parent theme type is defined in the child theme type.

Step 404, switching a display style of the display interface based on the value of the attribute name defined in the child theme type and of which the display style needs to be changed relative to the parent theme type.

It should be noted that steps 401-404 in the interface switching method provided in this embodiment and steps 301-304 in the foregoing embodiment are different merely in an application scenario, and specific implementations are generally the same. Therefore, details are not repeatedly described herein.

According to the interface switching method provided in this embodiment, when the application on the intelligent terminal starts, the display interface of the default style is loaded based on the preset parent theme type; during operation of the application, the data information currently processed by the application is read in real time, and the preset child theme type corresponding to the data information is obtained, wherein the value of the attribute name of which the display style needs to be changed relative to the parent theme type is defined in the child theme type; and the display style of the display interface is changed based on the value of the attribute name defined in the child theme type and of which the display style needs to be changed relative to the parent theme type. This can prevent confusion and lack of specificity in a modification due to duplicate value assignment of a same attribute in a child theme and a parent theme, and can display interfaces of different styles respectively for different intelligent terminals at different data processing stages, thereby improving user experience.

Figure 4:
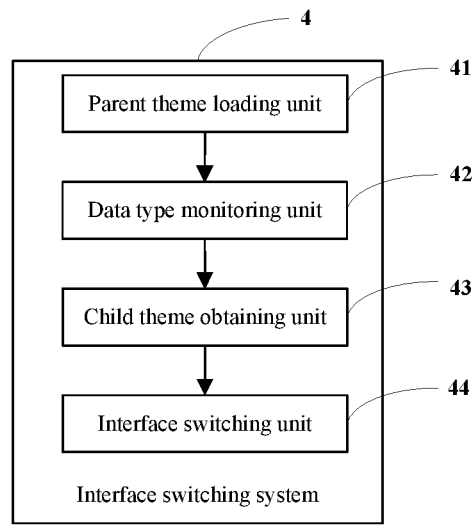
FIG. 4 is a schematic structural diagram of an interface switching system according to an embodiment of the present disclosure.

FIG. 4 is a schematic structural diagram of an interface switching system according to an embodiment of the present disclosure. For the convenience of description, only a part related to this embodiment is shown.

Referring to FIG. 4, an interface switching system 4 provided in this embodiment includes:

a parent theme loading unit 41 configured to load a display interface of a default style based on a preset parent theme type when an application starts;

a data type monitoring unit 42 configured to monitor whether a data type processed by the application changes in real time operation of the application;

a child theme obtaining unit 43 configured to: obtain a preset child theme type corresponding to a data type currently processed by the application based on the data type currently processed by the application if the data type changes, wherein a value of an attribute name of which a display style needs to be changed relative to the parent theme type is defined in the child theme type; and an interface switching unit 44 configured to switch a display style of the display interface based on the value of the attribute name defined in the child theme type and of which the display style needs to be changed relative to the parent theme type.

Optionally, the interface switching unit 44 is specifically configured to:

obtain an attribute name defined in the parent theme type and an attribute name defined in the child theme type; and overwrite a value of a same attribute name defined in the parent theme by using a value of a same attribute name defined in the child theme type if the child theme type and the parent theme type include a same attribute name; or display a new attribute name on the display interface based on a value of a new attribute name defined in the child theme type if the child theme type includes a new attribute name relative to the parent theme type.

Figure 5:
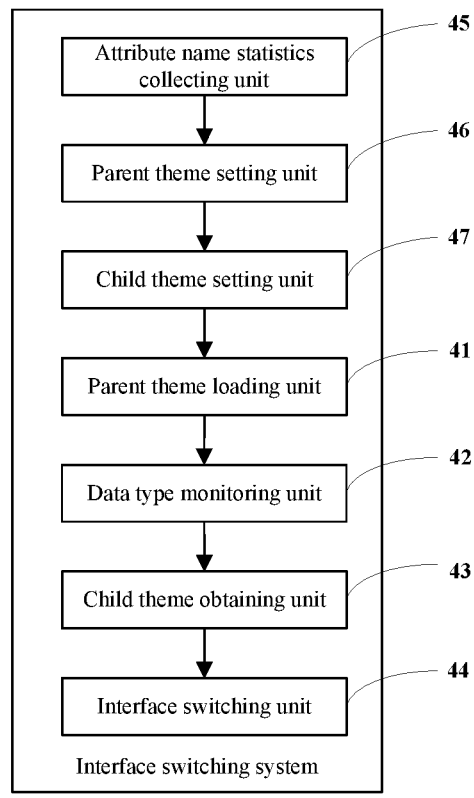
FIG. 5 is a schematic structural diagram of an interface switching system according to another embodiment of the present disclosure.

Optionally, referring to FIG. 5, in another embodiment, the interface switching system 4 further includes:

an attribute name statistics collecting unit 45 configured to collect statistics about attribute names that do not need to be changed and attribute names that need to be changed during the operation of the application;

a parent theme setting unit 46 configured to: set a parent theme type, and define a value of an attribute name that does not need to be changed and/or a default value of an attribute name that needs to be changed in the parent theme type; and a child theme setting unit 47 configured to: separately set corresponding child theme types for different data types, and define value of attribute names that need to be changed relative to the parent theme type in the various child theme types.

Optionally, the data types include a data source type and/or a data attribute type, and the child theme setting unit 47 is specifically configured to:

set different child theme types for different types of data sources; and/or set different child theme types for different types of data attributes.

It should be noted that the method embodiment of the present disclosure and the units of the system provided in this embodiment of the present disclosure are based on a same concept, and a technical effect brought by the units is the same as that brought by the method embodiment of the present disclosure. For specific content, reference may be made to relevant descriptions in the method embodiment of the present disclosure. Details are not repeatedly described herein.

It may be learned from the above that the interface switching system provided in this embodiment can also prevent confusion and lack of specificity in a modification due to duplicate value assignment of a same attribute in a child theme and a parent theme, and can display interfaces of different styles at different running stages of the application, thereby improving user experience.

It should be understood that the magnitude of the serial numbers of the steps in the foregoing embodiment does not mean an execution sequence. The execution sequence of the processes is determined by functions and internal logic of the processes and shall not be constructed as any limitation to implementation processes of this embodiment of the present disclosure.

Figure 6:
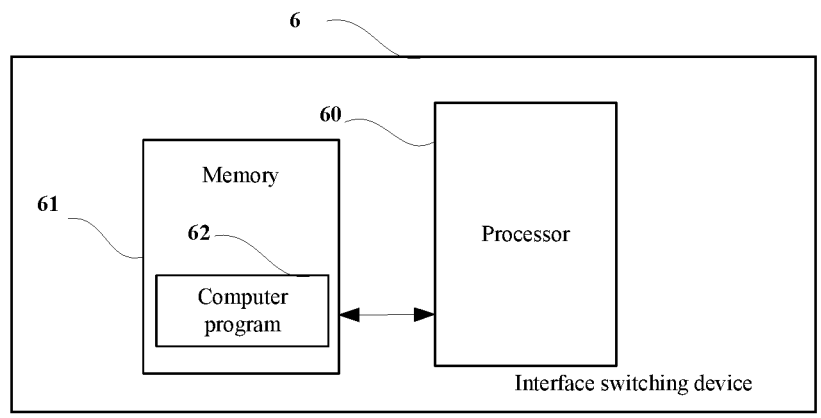
FIG. 6 is a schematic structural diagram of an interface switching device according to an embodiment of the present disclosure.

FIG. 6 is a schematic diagram of an interface switching device according to an embodiment of the present disclosure. As shown in FIG. 6, the interface switching device in this embodiment includes: a processor 60, a memory 61, and a computer program 62 that is stored in the memory 61 and that can run on the processor 60. When executing the computer program 62, the processor 60 performs functions of the modules/units in the foregoing the interface switching system embodiments, for example, functions of units 41 to 44 in FIG. 4. Alternatively, when executing the computer program 62, the processor 60 performs steps of the foregoing method embodiments, for example, steps 101-104 in FIG. 1.

For example, when the processor 60 is configured to execute the computer program 62 to perform the following steps of:

loading a display interface of a default style based on a preset parent theme type when an application starts;

monitoring whether a data type processed by the application changes in real time operation of the application;

obtaining a preset child theme type corresponding to a data type currently processed by the application based on the data type currently processed by the application if the data type changes, wherein a value of an attribute name of which a display style needs to be changed relative to the parent theme type is defined in the child theme type; and switching a display style of the display interface based on the value of the attribute name defined in the child theme type and of which the display style needs to be changed relative to the parent theme type.

For example, the processor 60 is configured to execute the computer program 62 to perform the following steps of:

collecting statistics about attribute names that do not need to be changed and attribute names that need to be changed during the operation of the application;

setting a parent theme type, and defining a value of attribute names that do not need to be changed and/or a default value of attribute names that need to be changed in the parent theme type; and separately setting corresponding child theme types for different data types, and defining a value of attribute names that need to be changed relative to the parent theme type in the child theme types.

For example, the data types include a data source type and/or a data attribute type, and the processor 60 is further configured to execute the computer program 62 to perform the following steps of:

setting different child theme types for different types of data sources; and/or setting different child theme types for different types of data attributes.

For example, the processor 60 is further configured to execute the computer program 62 to perform the following steps of:

obtaining an attribute name defined in the parent theme type and an attribute name defined in the child theme type; and overwriting a value of a same attribute name defined in the parent theme by using a value of a same attribute name defined in the child theme type if the child theme type and the parent theme type include the same attribute name; or displaying a new attribute name on the display interface based on a value of a new attribute name defined in the child theme type if the child theme type includes the new attribute name relative to the parent theme type.

The interface switching device 6 may be a computing device such as a desktop computer, a laptop computer, and a palmtop computer. The interface switching device 6 may include but is not limited to the processor 60 and the memory 61. Persons skilled in the art may understood that FIG. 6 is merely an example of the interface switching device, and does not limit the interface switching device 6. The interface switching device may include more or fewer components than those shown in FIG. 6, or a combination of some of the components, or different components. For example, the terminal may further include an input/output device, a network access device, a bus, and the like.

The processor 60 may be a central processing unit (Central Processing Unit, CPU), or may be another general purpose processor, digital signal processor (Digital Signal Processor, DSP), application-specific integrated circuit (Application Specific Integrated Circuit, ASIC), field programmable gate array (Field-Programmable Gate Array, FPGA) or another programmable logic device, discrete gate or transistor logic device, discrete hardware assembly, or the like. The general purpose processor may be a microprocessor, or the processor may be any conventional processor or the like.

The memory 61 may be an internal storage unit of the interface switching device, such as a hard disk or a memory of the interface switching device. The memory 61 can also be an external memory of interface switching device, such as a plug-in hard disk, a SMC (Smart Media Card), a SD (Secure Digital) card, a FC (Flash Card) equipped on interface switching device. Further, the memory 81 may include both the internal storage unit and the external memory of interface switching device, either. The memory 61 is configured to store the computer programs, and other procedures and data needed by interface switching device for determining wellbore cross-sectional shape. The memory 61 can also be configured to store data that has been output or being ready to be output temporarily.

It may be clearly understood by the one of ordinary skill in the art that, for describing conveniently and concisely, dividing of the aforesaid various functional units, functional modules is described exemplarily merely, in an actual application, the aforesaid functions may be assigned to different functional units and functional modules to be accomplished, that is, an inner structure of a data synchronizing device is divided into functional units or modules so as to accomplish the whole or a part of functionalities described above. The various functional units, modules in the embodiments may be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present disclosure. Regarding a specific working process of the units and modules in the aforesaid device, reference may be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

One of ordinary skill in the art will notice that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, but such implementations should not be considered as going beyond the scope of the present disclosure.

It should be understood that, in the embodiments of the present disclosure, the interface switching system/interface switching device and interface switching method could be implemented in other ways. For example, the interface switching device described above are merely illustrative; for example, the division of the units is only a logical function division, and other division could be used in the actual implementation, for example, multiple units or components could be combined or integrated into another system, or some features may be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which may be located in one place, or may be distributed to multiple network elements. Parts or all of the elements could be selected according to the actual needs to achieve the object of the present embodiment.

In addition, the various functional units in each of the embodiments of the present disclosure may be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it may be stored in a computer readable storage medium. Based on this understanding, a whole or part of flow process of implementing the method in the aforesaid embodiments of the present disclosure can also be accomplished by using computer program to instruct relevant hardware. In one embodiment, the present disclosure discloses a computer readable storage medium which stores the computer program, and when the computer program is executed by a processor, the processor is configured to implement steps in an interface switching method, including: loading a display interface of a default style based on a preset parent theme type when an application starts; monitoring whether a data type processed by the application changes in real time operation of the application; obtaining a preset child theme type corresponding to a data type currently processed by the application based on the data type currently processed by the application if the data type changes, wherein a value of an attribute name of which a display style needs to be changed relative to the parent theme type is defined in the child theme type; and switching a display style of the display interface according to the value of the attribute name defined in the child theme type and of which the display style needs to be changed relative to the parent theme type.

In one embodiment, before the step of loading a display interface of a default style based on a preset parent theme type when an application starts, the processor is further configured to perform the step of collecting statistics about attribute names that do not need to be changed and attribute names that need to be changed during the operation of the application; setting the parent theme type, and defining a value of attribute names that do not need to be changed and/or a default value of attribute names that need to be changed in the parent theme type; and separately setting corresponding child theme types for different data types, and defining value of attribute names that need to be changed relative to the parent theme types in the various child theme types.

In one embodiment, the data types include a data source type and/or a data attribute type, and the processor is further configured to perform the step of separately setting corresponding child theme types for different data types by setting different child theme types for different types of data sources; and/or setting different child theme types for different types of data attributes.

In one embodiment, the processor is further configured to perform the step of switching a display style of the display interface based on the value of the attribute name defined in the child theme type and of which the display style needs to be changed relative to the parent theme type by obtaining an attribute name defined in the parent theme type and an attribute name defined in the child theme type; overwriting a value of a same attribute name defined in the parent theme by using a value of a same attribute name defined in the child theme type if the child theme type and the parent theme type comprise the same attribute name; and displaying a new attribute name on the display interface based on a value of the new attribute name defined in the child theme type if the child theme type comprises the new attribute name relative to the parent theme type.

Wherein, the computer program comprises computer program codes, which may be in the form of source code, object code, executable documents or some intermediate form, etc. The computer readable medium can include: any entity or device that can carry the computer program codes, recording medium, USB flash disk, mobile hard disk, hard disk, optical disk, computer memory, ROM (Read-Only Memory), RAM (Random Access Memory) software distribution medium, etc.

As stated above, the aforesaid embodiments are only intended to explain but not to limit the technical solutions of the present disclosure. Although the present disclosure has been explained in detail with reference to the above-described embodiments, it should be understood for the one of ordinary skill in the art that, the technical solutions described in each of the above-described embodiments can still be amended, or some technical features in the technical solutions may be replaced equivalently; these amendments or equivalent replacements, which won't make the essence of corresponding technical solution to be broken away from the spirit and the scope of the technical solution in various embodiments of the present disclosure, should all be included in the protection scope of the present disclosure.

What is claimed is:

1. An interface switching method, comprising:
   loading a display interface of a default style based on a preset parent theme type when an application is started;
   monitoring whether a data type processed by the application is changed in real time operation of the application;
   obtaining a preset child theme type corresponding to a data type currently processed by the application based on the data type currently processed by the application if the data type is changed, wherein a value of an attribute name of which a display style needs to be changed relative to the parent theme type is defined in the child theme type; and
   switching a display style of the display interface according to the value of the attribute name defined in the child theme type and of which the display style needs to be changed relative to the parent theme type;
   wherein the step of switching a display style of the display interface according to the value of the attribute name defined in the child theme type and of which the display style needs to be changed relative to the parent theme type comprises:
   obtaining an attribute name defined in the parent theme type and an attribute name defined in the child theme type;
   overwriting a value of a same attribute name defined in the parent theme by using a value of a same attribute name defined in the child theme type if the child theme type and the parent theme type comprise the same attribute name;
   and displaying a new attribute name on the display interface based on a value of the new attribute name defined in the child theme type if the child theme type comprises the new attribute name relative to the parent theme type;
   wherein the attribute value of the new attribute name not only includes a display style of the new attribute name but also includes a position where the new attribute name is displayed in the interface.

2. The interface switching method according to claim 1, wherein before the step of loading a display interface of a default style based on a preset parent theme type when an application starts, the method further comprises:
   collecting statistics about attribute names that do not need to be changed and attribute names that need to be changed during the operation of the application;
   setting the parent theme type, and defining, in the parent theme type, a value of attribute names that do not need to be changed and/or a default value of attribute names that need to be changed; and separately setting corresponding child theme types for different data types, and defining value of attribute names that need to be changed relative to the parent theme types in the various child theme types.

3. The interface switching method according to claim 2, wherein the data types comprise a data source type and/or a data attribute type, and the step of separately setting corresponding child theme types for different data types comprises:

setting different child theme types for different types of data sources; and/or setting different child theme types for different types of data attributes.

4. An interface switching device, comprising: a memory, a processor, and a computer program stored in the memory and executable on the processor, wherein the processor is configured to execute the computer program to implement steps in an interface switching method, comprising:

loading a display interface of a default style based on a preset parent theme type when an application is started;

monitoring whether a data type processed by the application is changed in real time operation of the application;

obtaining a preset child theme type corresponding to a data type currently processed by the application based on the data type currently processed by the application if the data type is changed, wherein a value of an attribute name of which a display style needs to be changed relative to the parent theme type is defined in the child theme type; and switching a display style of the display interface according to the value of the attribute name defined in the child theme type and of which the display style needs to be changed relative to the parent theme type;

wherein the processor is further configured to perform the step of switching a display style of the display interface according to the value of the attribute name defined in the child theme type and of which the display style needs to be changed relative to the parent theme type by: obtaining an attribute name defined in the parent theme type and an attribute name defined in the child theme type;

overwriting a value of a same attribute name defined in the parent theme by using a value of a same attribute name defined in the child theme type if the child theme type and the parent theme type comprise the same attribute name; and displaying a new attribute name on the display interface based on a value of the new attribute name defined in the child theme type if the child theme type comprises the new attribute name relative to the parent theme type;

wherein the attribute value of the new attribute name not only includes a display style of the new attribute name but also includes a position where the new attribute name is displayed in the interface.

5. A computer readable non-transitory storage medium, wherein the computer readable storage medium stores a computer program, and when the computer program is executed by a processor, the processor is configured to implement steps in an interface switching method, comprising:

loading a display interface of a default style based on a preset parent theme type when an application is started;

monitoring whether a data type processed by the application is changed in real time operation of the application;

obtaining a preset child theme type corresponding to a data type currently processed by the application based on the data type currently processed by the application if the data type is changed, wherein a value of an attribute name of which a display style needs to be changed relative to the parent theme type is defined in the child theme type; and switching a display style of the display interface according to the value of the attribute name defined in the child theme type and of which the display style needs to be changed relative to the parent theme type;

wherein the processor is further configured to perform the step of switching a display style of the display interface according to the value of the attribute name defined in the child theme type and of which the display style needs to be changed relative to the parent theme type by:

obtaining an attribute name defined in the parent theme type and an attribute name defined in the child theme type;

overwriting a value of a same attribute name defined in the parent theme by using a value of a same attribute name defined in the child theme type if the child theme type and the parent theme type comprise the same attribute name; and displaying a new attribute name on the display interface based on a value of the new attribute name defined in the child theme type if the child theme type comprises the new attribute name relative to the parent theme type;

wherein the attribute value of the new attribute name not only includes a display style of the new attribute name but also includes a position where the new attribute name is displayed in the interface.

6. The interface switching device according to claim 4, wherein before the step of loading a display interface of a default style based on a preset parent theme type when an application starts, the processor is further configured to perform the step of collecting statistics about attribute names that do not need to be changed and attribute names that need to be changed during the operation of the application; setting the parent theme type, and defining, in the parent theme type, a value of attribute names that do not need to be changed and/or a default value of attribute names that need to be changed; and separately setting corresponding child theme types for different data types, and defining value of attribute names that need to be changed relative to the parent theme types in the various child theme types.

7. The interface switching device according to claim 6, wherein the data types comprise a data source type and/or a data attribute type, and the processor is further configured to perform the step of separately setting corresponding child theme types for different data types by setting different child theme types for different types of data sources; and/or setting different child theme types for different types of data attributes.

8. The computer readable non-transitory storage medium according to claim 5, wherein before the step of loading a display interface of a default style based on a preset parent theme type when an application starts, the processor is further configured to perform the step of collecting statistics about attribute names that do not need to be changed and attribute names that need to be changed during the operation of the application; setting the parent theme type, and defining a value of attribute names that do not need to be changed and/or a default value of attribute names that need to be changed in the parent theme type; and separately setting corresponding child theme types for different data types, and defining value of attribute names that need to be changed relative to the parent theme types in the various child theme types, before the step of loading a display interface of a default style based on a preset parent theme type when an application starts.

9. The computer readable non-transitory storage medium according to claim 8, wherein the data types comprise a data source type and/or a data attribute type, and the processor is further configured to perform the step of separately setting corresponding child theme types for different data types by setting different child theme types for different types of data sources; and/or setting different child theme types for different types of data attributes.

\* \* \* \* \*